E. E. FLEMING.
SEALING DEVICE FOR ENVELOPS.
APPLICATION FILED APR. 19, 1913.
1,117,992.
Patented Nov. 24, 1914.
2 SHEETS—SHEET 2.
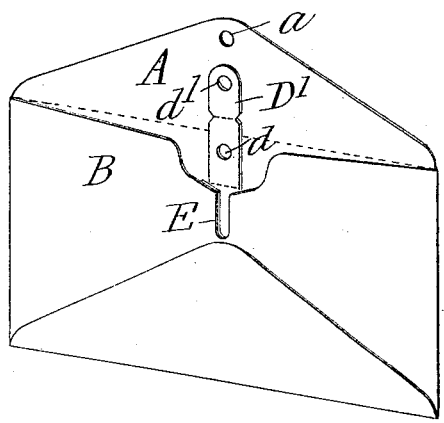
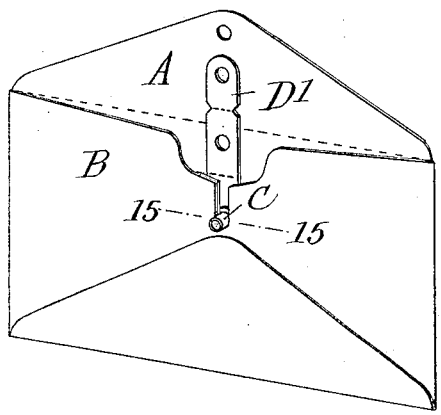
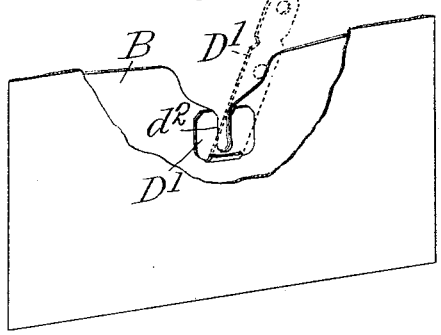
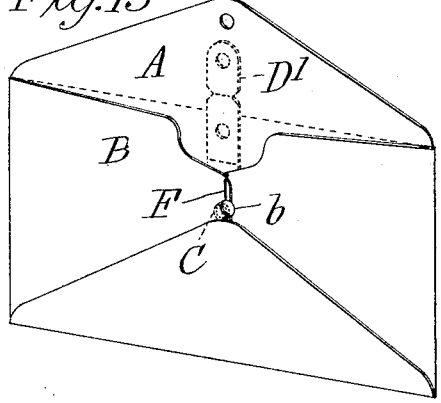
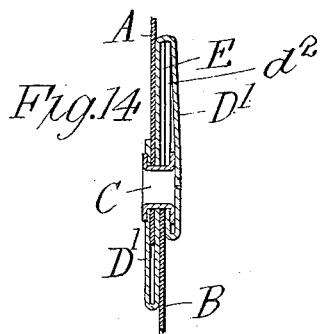
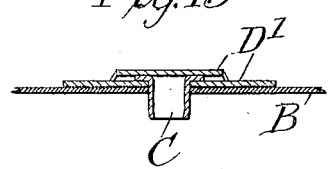
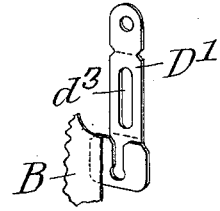
WITNESSES:
Joseph C. Stack.
W. Wallace Nairn Jr
INVENTOR
Edward E. Fleming
By Julius C. Donel
his ATTORNEY

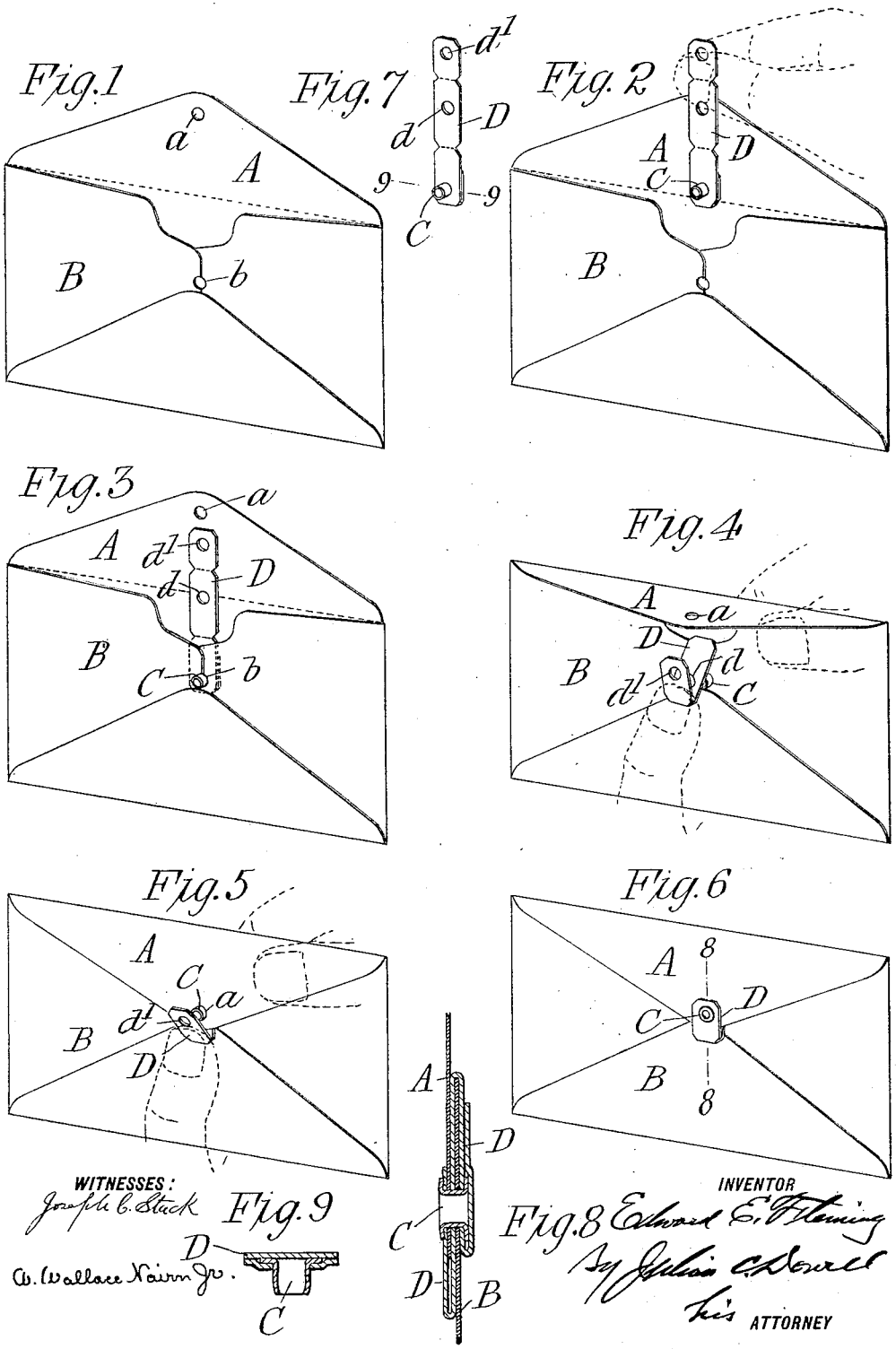

UNITED STATES PATENT OFFICE.

EDWARD E. FLEMING, OF MAUGANSVILLE, MARYLAND.

SEALING DEVICE FOR ENVELOPS.

1,117,992.      Specification of Letters Patent.      Patented Nov. 24, 1914.

Application filed April 19, 1913. Serial No. 762,318.

*To all whom it may concern:*

Be it known that I, EDWARD E. FLEMING, a citizen of the United States, residing at Maugansville, in the county of Washington and State of Maryland, have invented certain new and useful Improvements in Sealing Devices for Envelops; and I do hereby declare the following to be a full, clear, and exact description of the invention, such as will enable others skilled in the art to which it appertains to make and use the same.

This invention relates to devices for fastening and sealing envelops, and has for its object to provide a simple and efficient device of the character referred to for attachment to an envelop in such manner as to provide a secure fastening and an effectual seal that will not permit the envelop to be opened without mutilation to show that it has been tampered with, or the seal broken, and at the same time to provide means for reinforcing the envelop to strengthen it about the points of attachment of the sealing device; the latter being adapted to be manufactured and sold separately as an attachment for use in sealing envelops or made a permanent part thereof as desired.

The invention will first be hereinafter more particularly described, with reference to the accompanying drawings, which form a part of this specification, and then pointed out in the claims at the end of the description.

In said drawings, Figure 1 is a perspective view of an envelop having holes in the back and closing flap thereof for use with my improved reinforcing and sealing device; Fig. 2 is a perspective view of the same showing the reinforcing and sealing device about to be placed in position for sealing the envelop; Figs. 3, 4, 5 and 6 are perspective views illustrating the successive steps in attaching the sealing device to and sealing the envelop; Fig. 7 is a perspective view of the reinforcing and sealing device detached; Fig. 8 is a detail sectional view taken on the line 8—8 of Fig. 6; Fig. 9 is a detail sectional view taken on the line 9—9 of Fig. 7; Fig. 10 is a perspective view illustrating a modification of the reinforcing and sealing device and a modified form of envelop, the eyelet used therewith being omitted; Fig. 11 is a similar view to that shown in Fig. 10, with the eyelet attached ready for use in sealing the envelop; Fig. 12 is a perspective view of an envelop with an attached sealing device, indicated partly in dotted lines, applied to the inner side of the back of the envelop, the front of the envelop being partly broken away to show the method of attaching the reinforcing and sealing device to the inside of the back thereof; Fig. 13 is a perspective view of an envelop having a slit for inserting the eyelet instead of an open-ended slot as shown in Figs. 10 to 12 for inserting the eyelet; the flexible strip of the sealing device being indicated in dotted lines; Fig. 14 is a detail vertical sectional view, on a slightly enlarged scale, through the center of an envelop and the reinforcing and sealing device attached thereto and sealed; Fig. 15 is a detail sectional view taken on the line 15—15 of Fig. 11; and Fig. 16 is a perspective view of another modification of the reinforcing and sealing device.

Referring to the drawings, in which the same reference letters are used to denote corresponding parts in different views, the letter A may denote the closing flap of an envelop having a hole $a$ therein adapted when closed to register with a similar hole $b$ in the back B of the envelop; said holes when in register being designed to receive an eyelet C or equivalent device projecting from the sealing device D, which, as shown in Sheet 1 of the drawings may consist of a flat strip of paper, papier mâché, or other suitable material, carrying the eyelet C at one end and having spaced perforations or holes $d$ $d^1$ therein to receive the eyelet C. The eyelet may be secured to the flexible strip by inserting it through a hole near one end of the strip and turning said end back over onto the flanged end of the eyelet and gluing or otherwise securing it to the main body of the strip so as to clamp the flange of the eyelet firmly in place between the folded portions of the strip as shown more clearly in Figs. 7 and 9.

When it is desired to seal an envelop using the device of the form shown in Fig. 7, such device is placed inside the envelop in the manner indicated in Fig. 2 and the eyelet passed through the hole $b$ in the back of the envelop, as indicated in Fig. 3. The body of the strip is then folded down upon the back of the envelop so that the eyelet may protrude through the opening $d$, whereupon the closing flap is turned down so that the eyelet may pass through the opening $a$ therein, as shown in Fig. 5, and the free end of the strip is then turned up over the closing flap so as to permit the eyelet to pass through the opening $d^1$, whereupon, by means of a suitable tool, the projecting end of the eyelet is swaged or upset so as to form a flange overlying the closing flap as shown in Figs. 6 and 8, thus effectually sealing the envelop so that it may not be opened without so mutilating the flap or the back of the envelop as to render it impossible to restore the parts to normal position and prevent detection. The closing flap may also be gummed in the usual manner, if desired, for sealing the envelop in the usual way.

Figs. 10 to 15 of the drawings illustrate a modification of the sealing device, which, in this instance, consists of a flexible strip similar to that shown in Sheet 2 of the drawings, but instead of attaching the eyelet permanently to the strip the latter, which is denoted by the letter $D^1$, is formed or provided with a forked end or open-ended slot $d^2$ at one end which may be secured to the back of the envelop by an adhesive substance or otherwise with said forked end or slot of the strip in alinement with an open-ended slot E in the back of the envelop; said slots terminating in an opening of such size as to receive and hold the eyelet which protrudes therethrough while its flanged end is seated between the forked end of the strip and the upturned body portion thereof, as shown more clearly in Figs. 11 and 15, thus securing the eyelet in position for fastening and sealing the envelop without permanently fastening the eyelet to the strip.

The operation of sealing an envelop with the fastening and sealing device of the form shown in Figs. 10 to 15 after seating the eyelet in the forked end of the strip so that it may protrude through the open-ended slot in the back of the envelop, as shown in Fig. 11, is substantially the same as described with reference to the form shown in Sheet 1 of the drawings.

In Fig. 13 of the drawings the envelop is shown with a slit F in the back thereof instead of the open-ended slot shown in Figs. 10 to 11, to permit the eyelet to be slid down into the hole $b$, in applying the sealing device.

In Fig. 16, the flexible strip is shown with an elongated opening or slot $d^3$ instead of the round hole $d$ in the intermediate portion of the strip, this slot being designed to adapt the device to be applied to envelops of different sizes. The elongated opening or slot permits the intermediate portion of the strip to be turned up and over the eyelet at any place which is most convenient, according to the size of the flap of the envelop with which the fastener is used; the forked portion of the strip being fastened to the envelop and the main body of the strip turned up against the forked portion to provide a seat for the eyelet as already explained with reference to Figs. 10 to 13. It is obvious that the slot might be used with any of the forms shown, whether with or without the forked end, and that the fork or slot might be dispensed with by merely providing a circular opening to receive the eyelet, as in Fig. 7. The width of the strip, or the end thereof which is attached to the envelop, may also be varied to any desired extent for reinforcing and strengthening the envelop about the points of attachment of the sealing device.

The advantages of my improvement are obvious. Both the envelop and the reinforcing and sealing device may be made and sold either separately or together and the sealing device being unattached will in no way interfere with the use of the typewriting machine in typewriting the address on the envelop. It will also be understood that the number of these little devices that may be used with a single envelop is unlimited, depending solely on the size of the envelop and the wishes of the user. Various changes may also be made in the details of construction and arrangement of parts without departing from the spirit and scope of my invention, and I therefore do not desire to be limited to the specific form shown.

Having thus described my invention, what I claim as new and desire to secure by Letters Patent of the United States is:

1. In combination with an envelop, of a sealing device comprising a flexible strip and a stud, said strip being adapted to have one end inserted in the envelop and against the back thereof; and then be folded back upon itself over the back of the envelop to embrace the latter between such fold; and then to be again turned back upon itself and over the flap of the envelop, after the latter is closed and said stud being adapted to be inserted through the inner end of the said strip and a corresponding opening in the back of the envelop and to engage openings in the folded portions of the strip and in the flap of the envelop when the latter is closed, and to have its free end upset, said stud transfixing the three folds of the strip and the back and flap portions of the envelop lying between the folds of the strip.

2. In combination with an envelop; a sealing device comprising a flexible strip and an eyelet, said strip having a slotted end adapted to be inserted in the envelop and against the back thereof, and then be folded back upon itself and over the back of the envelop so as to embrace the back of the envelop between such first fold thereof, and then be again folded back upon itself over the flap of the envelop when closed; said eyelet being adapted to be inserted through the inner end of said strip, and a corresponding opening in the back of the envelop, and through registering openings in the folds of the strip and in the flap of the envelop when the latter is closed, and to have its free end upset upon the outer portion of the strip overlying said flap so that said stud-eyelet transfixes the three folds of the strip and the back and flap of the envelop, substantially as described.

3. In combination with an envelop, of a sealing device comprising a flexible non-metallic strip and a stud, said strip being adapted to have one end inserted in the envelop and against the back thereof, and then be folded back and forth upon itself to embrace the back of the envelop in one fold thereof, and embrace the flap of the envelop in another fold thereof, and a stud adapted to be inserted through the inner end of the said sealing strip and corresponding openings in the back and flap of the envelop and in folds of the strip; one of the intermediate folds of said strip having an elongated opening therein, whereby the device is adapted to be applied to envelops of various sizes; said stud transfixing the three folds of the strip and the back and flap portions of the envelop lying between the folds of the strip; and the inner end of the strip being upturned so as to cover the head of the said stud, substantially as described.

4. In combination with an envelop; a sealing device comprising a flexible strip having a slotted end adapted to be inserted in the envelop and against the back thereof, and then be folded back upon itself to and over the back of the envelop so as to embrace the back of the envelop between the fold thereof, and again folded upon itself over the flap of the envelop when closed; and an eyelet adapted to be inserted through the inner end of the said sealing strip and a corresponding opening in the back of the envelop, and to engage corresponding openings in the folded portions of the strip in the flap of the envelop when the latter is closed, and to have its free end upset upon the outer portion of the strip overlying said flap, the inner end of the strip being upturned so as to cover the head of the said eyelet and secure the latter in place, and said eyelet transfixing the three folds of the strip and the back and flap portions of the envelop lying between the folds of the strip, one of the intermediate folds of said strip having an elongated opening therein, whereby the device is adapted to be applied to envelops of various sizes.

In testimony whereof I affix my signature in the presence of two witnesses.

EDWARD E. FLEMING.

Witnesses:
 DANIEL W. DOUB,
 WILLIAM O. DOUB.

Copies of this patent may be obtained for five cents each, by addressing the "Commissioner of Patents, Washington, D. C."